United States Patent Office 3,132,926
Patented May 12, 1964

---

3,132,926
CARBON BLACK MANUFACTURE
Theodore A. Ruble, Amarillo, Tex., assignor to Continental Carbon Company, Amarillo, Tex., a corporation of Delaware
No Drawing. Filed Jan. 6, 1961, Ser. No. 80,989
4 Claims. (Cl. 23—209.4)

This invention relates to the manufacture of carbon black and more particularly concerns the use of a normally liquid, substantially completely vaporizable carbonaceous material as the carbon producing feedstock for the preparation of carbon blacks exhibiting improved properties when employing as a filler in cured rubber compositions.

Still more specifically, the present invention relates to a furnace process for the efficient production of a carbon black capable of improving the heat build-up characteristics of cured rubber compositions wherein said process a substantially completely vaporizable carbon producing feedstock is employed which comprises an admixture of a residual oil derived in the thermal or catalytic cracking of a petroleum stock, said residual oil having a hydrogen to carbon atomic ratio less than about 1.25 and a °API gravity less than about 10, and a distillable hydrocarbon fraction having a hydrogen to carbon atomic ratio of greater than about 1.25 and a °API gravity greater than about 10.

It is an object of this invention to provide an improved process for the production of carbon black.

Another object is to provide a carbon producing oil feedstock for use in a furnace process, said feedstock capable of dissociating into carbon black having improved rubber reinforcing properties.

A still further object of the present invention is to provide an economical process for the production of superior rubber reinforcing grades of carbon black.

These and other objects of this invention will be more completely understood by those skilled in the art upon consideration of the detailed discussion and specific embodiment set forth hereinbelow.

The process contemplated for the production of carbon black in accordance with this invention is well known in the art and is generally referred to therein as the furnace process. Briefly stated, the furnace process consists of burning a carbonaceous material in a reactor, usually a refractory-lined furnace, with a deficiency of air.

Since the essence of my invention concerns the use of a novel type of carbon black producing feedstock which feedstock is composed in part of the type of petroleum residual generally described above, it warrants considering same with more particularity. These residual oils are characterized in having a hydrogen to carbon ratio of from about 0.75 to about 1.25, a °API gravity of not more than about 10, a viscosity of in excess of 30 SSU at 210° F. and a specific gravity in excess about 1.0. These materials are further characterized in that they are not considered to be completely vaporizable. As taught in U.S. Patent No. 2,917,370, many of these feedstock products will commence to crack before 50% thereof is vaporized. Consequently, in the use of these particular types of residual oils it is necessary to observe certain vaporization techniques when injecting them as a feedstock into a carbon black reactor. One of such methods consists of the high pressure atomization of the heavy feedstock and there are a number of injection devices manufactured for this purpose. A somewhat different atomization technique is shown in the above-mentioned U.S. Patent 2,917,370.

By my invention, I have discovered a way of modifying the above difficultly atomizable feedstocks so that they can be readily and substantially completely vaporized prior to the introduction thereof into a carbon black reactor. Quite obviously, the use of a feedstock which is per se vaporizable, or capable of being completely vaporized in accordance with this invention, is especially desirable from the standpoint of convenience for it eliminates the necessity of using expensive atomization devices which, it might be mentioned, are subject to choking-up problems thus impairing production rates. Furthermore, the use of vaporizable feedstocks results in improved efficiency of operation. The main advantage of this invention, however, does not reside in rendering vaporizable a carbonaceous material which the prior art teaches cannot be vaporized but more importantly in the finding that the feedstocks of my invention result in the preparation of carbon blacks of improved quality. More specifically with regard to the latter aspect, the carbon blacks prepared by the process taught herein exhibit lower heat build-up characteristics when the blacks are employed in cured rubber compositions. This is extremely important in a number of present day applications in which carbon black is used. For example, there have been certain technological advances in the design and formulation of automobile tires which cause the tire under certain operational conditions to heat up to a disadvantageously higher degree than heretofore encountered resulting in shorter tire life by "blow out." The problem of adequately dissipating this heat is inherently difficult and consequently the advantage realized in using a carbon black which inhibits the heat build-up tendency of the rubber composition is of extreme importance. Additionally, the carbon blacks obtained in the practice of this invention exhibit improved oil adsorption, modulus and tensile strength properties over that observed for blacks derived in using a residual oil solely as a feedstock.

The advantages enumerated above are secured in a surprisingly simple manner. I have found that the addition of a completely vaporizable petroleum distillate to a residual oil containing a substantial amount of a nonvaporizable component allows the combination of the two to be essentially completely vaporized under relatively moderate temperature conditions without costly use of atomization devices, and, unexpectantly, that the use of such carbonaceous admixtures as carbon producing feedstocks in a furnace process yields carbon black evidencing the improvement in quality as aforementioned.

The type of petroleum products that can be blended with the residual oils vary over a comparatively wide range of physical properties and include a multitude of distillable petroleum stocks. Suitable among such products are the virgin distillates obtained by fractionating crude petroleum stocks. Furthermore, these can be cracked stocks such as the various cycle oils secured in the thermal or catalytic cracking of petroleum stocks. Additionally, these materials can be obtained by segregating distillable fractions from petroleum stocks by solvent extraction methods.

The distillate or extraction fractions having usefulness in the practice of this invention may be further identified as those having a hydrogen to carbon atomic ratio greater than about 1.25, a °API gravity greater than about 10 and more preferably between about 15 and 30. The boiling range temperature of the distillate is not critical but preferably the bulk thereof should distill under atmospheric conditions at a temperature in the order of 700° F. or less.

The distillates or extracts can be blended with the residual products over a comparatively wide range of limits. For example, the feedstock can be composed of from about 75 to 25 parts of the residual component and correspondingly from 25 to 75 parts of the distillate. More preferably, the content of the residual component upon the above basis is from about 55 to 75 parts.

There have been a number of apparatuses developed heretofore capable of thermally cracking a carbonaceous material in accordance with the principle of the furnace process. While this invention can be practiced using all these various apparatuses, it is preferred, however, to use a reactor assembly such as exemplified in U.S. Patent 2,564,700, or the improved departure therefrom disclosed in my pending U.S. application Serial No. 789,714, filed January 28, 1959, now U.S. Patent No. 2,976,128. These reactors are preferred because the operational features thereof are versatility adapted to permit the preparation of a desired range of carbon black products.

More specifically, the reactor of U.S. Patent 2,564,700 employs a cylindrical combustion chamber wherein a burning gas or other fuel is tangentially introduced in order to provide the heat necessary to crack the carbon black producing feedstock which is introduced axially into said chamber. The combustion chamber is employed in combination with a cylindrical reactor zone. The combustion chamber is of greater diameter than the reaction zone whereas the length of the reaction zone is generally substantially greater than that of the combustion chamber. The two cylindrical members are co-axial and in communication with each other. The combustion chamber is provided with at least one tangential inlet through which a combustible mixture of fuel and air is injected to form a swirling body or blanket of hot combustion gases which advances in a generally helical pattern into and along the wall of the reaction zone, thus providing a heat radiant sheath capable of supplying necessary thermal cracking requirements and additionally capable of preventing the feedstock undergoing dissociation from contacting the side of the reactor and consequently substantially obviating formation of coke or grit particles.

While the foregoing describes the general nature of this invention, the following example is presented which illustrates in detail the present inevntion and the advantages to be realized in the practice thereof. It is to be understood, however, that any enumeration of details contained therein is not to be construed as a limitation on the invention except as set forth in the appended claims.

EXAMPLE I

The carbon production runs of this example were carried out in the type of carbon black reactor described generally hereinabove. The reactor, as mentioned, corresponds to the apparatus exemplified in U.S. Patent 2,564,700. More specifically, the reactor assembly utilized comprised a combustion chamber 12-inches in length and 36-inches in diameter which was provided with two tangential inlets about 8-inches in diameter and 180° apart. Each of said inlets in turn was provided with a burner. The combustion chamber was in axial alignment and in communication with a reaction chamber having a length of approximately 11-feet and a diameter of 12-inches.

In the operation of the above apparatus the carbon black bearing effluent gases leaving the reaction chamber were immediately cooled to approximately 1000° F. in the quench section of the reactor which section was immediately adjacent to the downstream end of the reaction chamber. The effluent from the quench section was then passed through a long duct to a vertical cooling tower and therein cooled to approximately 500° F. before conducting same to a plurality of collecting cyclones in series. Approximately 80% of the black was collected in said cyclones and the exit effluent gases therefrom were conveyed through a bag filtering arrangement.

In each of the runs of this example certain identical operating conditions were observed. These conditions consisted of introducing 145,000 s.c.f.h. of tangential air into the combustion chamber, together with a sufficient rate of propane so as to provide a mixture thereof having essentially a theoretical ratio of air to fuel. Combustion of this mixture resulted in a temperature of about 2700° F. within the combustion chamber.

Run No. I of this example was carried out using a feedstock consisting solely of a residual oil. The characteristics of the residual oil were as follows.

*Residual Oil*

| | |
|---|---|
| ° API gravity | 2.3 |
| Viscosity SSF @ 122° F | 102 |
| Ash, percent | 0.1 |
| Sulfur, percent | 1.43 |
| Carbon, percent | 89.77 |
| Hydrogen, percent | 8.26 |
| H/C Atomic ratio | 1.1 |

Boiling Point (ASTM) characteristics:

| | ° F. |
|---|---|
| Initial B.P. | 600. |
| 10% | 640. |
| 20% | 654. |
| 30% | 675. |
| 40% | 695. |
| 50% | 715. |
| 60% | 735. |
| 70% | Commenced to crack. |

Employing the above residual oil solely as the feedstock necessitated the use of high pressure (100 p.s.i.) atomization injection means. The rate of feedstock injection was 225-gallons per hours which rate represented full or maximum load for the production of HAF carbon black. In an extended operation under the conditions stated, the average yield of carbon black realized was 4.7-pounds per gallon of feedstock consumed.

In Run II of this example a blended feedstock was used employing the identical reactor of Run I and substantially the same processing conditions observed therein, i.e., the same rates of combustion air and propane. The blended feedstock comprised an admixture of 60% of the residual oil of this example and 40% of a light gas oil having the following characteristics:

| | |
|---|---|
| ° API gravity | 26.9 |
| H/C atomic ratio | 1.40 |
| End B.P. ° F | <750 |

In Run II the rate of introduction of the blended feedstock under full load conditions was 260-gallons per hour. Immediately prior to the introduction of the blended feedstock into the combustion chamber, same was preheated to a temperature of 750° F. which preheating caused substantially complete vaporization thereof. Accordingly, the introduction of the blended feedstock material was expediently accomplished by merely passing same axially into the combustion chamber through an open end pipe of approximately ¾-inch (I.D.) The average yield of HAF carbon black over a period of twenty-four hours of operation of this run amounted to 4.7 pounds per gallon of the feedstock which, as is to be noted, was the identical yield obtained using the straight residual oil as feedstock.

From a consideration of the above comparative data, it can be readily seen that the use of a blended feedstock in accordance with this invention results in a 10% higher production rate for a given plant installation. This improvement was totally unexpected since it was known that the maximum obtainable yield of HAF carbon black using the light oil solely as the feedstock is from about 2.3 to 2.5 pounds per gallon.

A further surprising attribute of this invention, is that the carbon black produced thereby showed significantly improved (compared to the product of Run I) heat build-up properties when the black was compounded in a cured synthetic rubber composition.

I claim:

1. A process for the manufacture of carbon black which includes the steps: (1) preheating a carbon black producing feedstock consisting essentially of an admixture of from about 75 to 25 parts of a residual oil having a hydrogen to carbon atomic ratio of less than about 1.25 and a °API gravity less than about 10, said residual oil further characterized in containing a substantial amount of a non-vaporizable component, and correspondingly from about 25 to 75 parts of a petroleum distillate having a hydrogen to carbon atomic ratio of greater than about 1.25 and a °API gravity between about 10 and 30 to a temperature which effects substantially complete vaporization of said petroleum distillate component thereof; (2) continuously introducing into one end of an elongated reactor said preheated feedstock and continuously establishing about the latter a turbulent heat-radiant layer of hot combustion gases having a temperature in excess of about 2000° F.; (3) continuously passing said feedstock together with the surrounding layer of hot combustion gases through the elongated reactor so as to effect dissociation of a predominant portion of the feedstock into carbon black and by-product gases; and (4) recovering carbon black from the effluent emanating from said reactor.

2. A process in accordance with claim 1 wherein said residual oil is the bottoms fraction of a thermal cracking operation.

3. A process in accordance with claim 2 wherein said petroleum distillate has a °API gravity of between about 15 and 30.

4. A process in accordance with claim 3 wherein said feedstock comprises from about 55 to 75 parts of said residual oil and correspondingly from about 45 to 25 parts of said petroleum distillate.

References Cited in the file of this patent

UNITED STATES PATENTS

| | | |
|---|---|---|
| Re. 22,886 | Ayers | June 3, 1947 |
| 2,375,796 | Krejci | May 15, 1945 |
| 2,564,700 | Krejci | Aug. 21, 1951 |
| 2,617,714 | Arnold | Nov. 11, 1952 |
| 2,693,441 | Helmers | Nov. 2, 1954 |
| 2,794,710 | Lawson | June 4, 1957 |
| 2,832,363 | Wood et al. | Apr. 29, 1958 |